United States Patent [19]

Hashimoto

[11] Patent Number: 5,790,091
[45] Date of Patent: Aug. 4, 1998

[54] COLOR DATA DISPLAYING APPARATUS

[75] Inventor: Kayoko Hashimoto, Ome, Japan

[73] Assignee: Casio Computer Co., Ltd., Tokyo, Japan

[21] Appl. No.: 600,468

[22] Filed: Feb. 12, 1996

Related U.S. Application Data

[63] Continuation of Ser. No. 249,384, May 25, 1994, abandoned.

[30] Foreign Application Priority Data

| May 31, 1993 | [JP] | Japan | 5-152883 |
| Jun. 30, 1993 | [JP] | Japan | 5-189150 |
| Jun. 30, 1993 | [JP] | Japan | 5-189156 |

[51] Int. Cl.$^6$ .................................... G09G 5/02
[52] U.S. Cl. ..................... 345/150; 345/186; 345/199
[58] Field of Search ............................. 345/150, 153, 345/154, 155, 156, 157, 186, 192, 199, 201, 203; 395/131, 140; 348/77

[56] References Cited

U.S. PATENT DOCUMENTS

| 1,629,330 | 5/1927 | Adler | 434/99 |
| 4,359,585 | 11/1982 | Spackova et al. | 348/77 |
| 4,682,956 | 7/1987 | Krane | 434/237 |
| 4,800,510 | 1/1989 | Vinberg | 395/140 |
| 4,854,880 | 8/1989 | Nasby | 434/395 |
| 5,504,499 | 4/1996 | Horie et al. | 345/150 |

OTHER PUBLICATIONS

Newquist III, Harvey P. "Experts at Retail" Datamation Apr. 1, 1990. pp. 53–56.

Saunders, M. "Color & Light Therapy", Extraordinary Science Jan./Feb./Mar. 1992. pp. 21–24.

*Primary Examiner*—Xiao Wu
*Attorney, Agent, or Firm*—Frishauf, Holtz, Goodman, Langer & Chick

[57] ABSTRACT

A color data displaying apparatus displays data concerning colors. Evaluation data concerning color data are previously stored in a memory. When color data is designated, evaluation data concerning the designated color data is read out from the memory, and is displayed on a display unit. Further image data are also stored in the memory, each of which image data represents an image given by a combination of at least two color data. When image data and one color data are designated, other color data is read out and displayed on the display unit, other color data which will give the image represented by the designated image data when combined with the designated color data.

5 Claims, 19 Drawing Sheets

| FIRST COLOR NOS. \ SECOND COLOR NOS. | 01 GREEN | 02 LIGHT BLUE | 03 BLUE |
|---|---|---|---|
| GREEN | A:4 C:8<br>B:8 D:7 | A:4 C:6<br>B:9 D:5 | A:4 C:6<br>B:9 D:6 |
| LIGHT BLUE | A:4 C:6<br>B:9 D:5 | A:7 C:8<br>B:7 D:6 | A:4 C:7<br>B:8 D:3 |
| BLUE | A:4 C:6<br>B:9 D:6 | A:4 C:7<br>B:8 D:3 | A:4 C:7<br>B:8 D:5 |
| DARK BLUE | A:7 C:10<br>B:8 D:7 | A:4 C:7<br>B:9 D:4 | |
| PURPLE | A:1 C:2<br>B:6 D:9 | A:4 C:6<br>B:6 D:7 | |

IMAGE RATE
A: CUTENESS  C: ELEGANCE
B: SPORTINESS  D: PERSONALITY

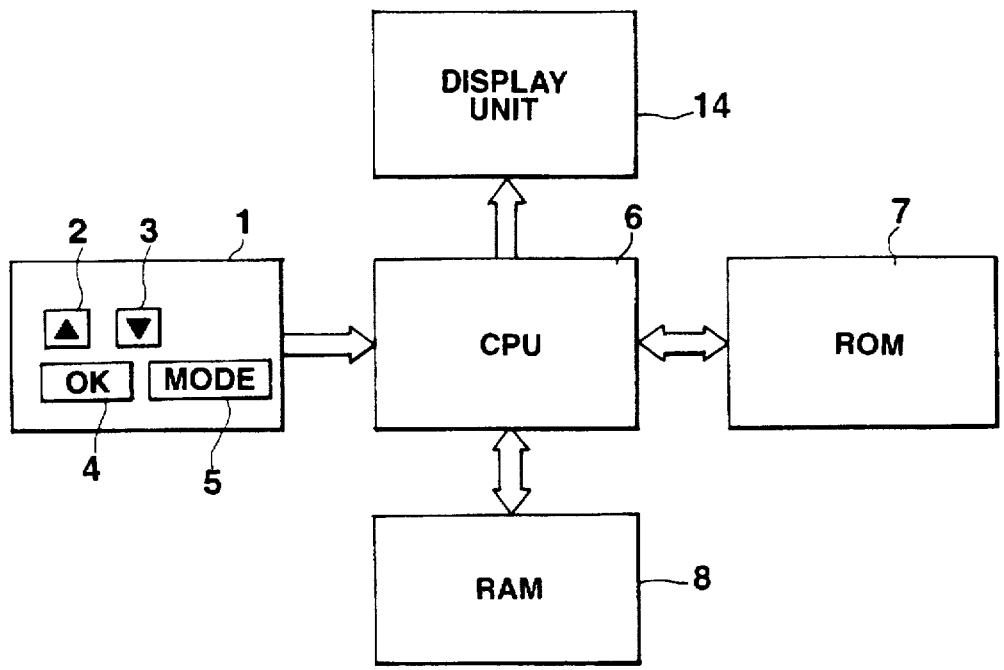

FIG.3

| FIRST COLOR NOS. \ SECOND COLOR NOS. | 01 GREEN | 02 LIGHT BLUE |
|---|---|---|
| 01 GREEN | NATURAL COLOR ARRANGEMENT | GIVING IMAGE OF BROOK IN FOREST |
| 02 LIGHT BLUE | GIVING NATURAL IMPRESSION | GIVING KIND AND GENTLE IMAGE |
| 03 BLUE | GIVING IMAGE OF SEA | GIVING IMAGE OF LAKE |
| 04 DARK BLUE | GIVING TRADITIONAL IMAGE | GIVING NEAT AND TIDY IMPRESSION |
| 05 PURPLE | GIVING BOLD AND GROWN-UP IMPRESSION | ⋮ |

FIG.4

| COLOR NOS. \ FEELING NOS. | 01 CUTENESS | 02 SPORTINESS | 03 ELEGANCE | 04 PERSONALITY |
|---|---|---|---|---|
| 01 GREEN | YELLOW | WHITE | BLACK | ORANGE |
| 02 LIGHT BLUE | PINK | DARK BLUE | BLACK | RED |
| 03 BLUE | PINK | GREY | GREE | BROWN LIGHT |
| 04 DARK BLUE | PINK | RED | WHITE | PURPLE |

FIG.5

| FIRST FEELING NOS. \ SECOND FEELING NOS. | 01 CUTENESS | 02 SPORTINESS | 03 ELEGANCE |
|---|---|---|---|
| 01 CUTENESS | LIGHT BLUE+BLACK BLUE+PINK RED+RED WHITE+YELLOW | | |
| 02 SPORTINESS | GREEN+YELLOW LIGHT BLUE+PINK WHITE+WHITE DARK BLUE+PINK | GREEN+BLUE BLUE+GREY WHITE+WHITE DARK BLUE+WHITE | |
| 03 ELEGANCE | LIGHT BLUE+PINK DARK BLUE+PINK YELLOW+WHITE | LIGHT BLUE+BLACK CREAM+BLACK WHITE+WHITE BEIGE+DARK BLUE | LIGTH BLUE+BLACK BLUE+LIGHT BROWN PURPLE+PURPLE ORANGE+PINK |

FIG.6

| FIRST COLOR NOS. / SECOND COLOR NOS. | 01 GREEN | 02 LIGHT BLUE | 03 BLUE | 04 DARK BLUE |
|---|---|---|---|---|
| 01 GREEN | 27 | | | |
| 02 LIGHT BLUE | 24 | 28 | | |
| 03 BLUE | 28 | 22 | 24 | |
| 04 DARK BLUE | 30 | 24 | 22 | 20 |

FIG. 10A

COLOR OF WEAR?
01 : GREEN
02 : LIGHT BLUE
03 : BLUE

FIG. 10B

FEELING?
01 : CUTENESS
02 : SPORTINESS
03 : ELEGANCE

FIG. 10C

"ELEGANT COMBINATION WITH GREEN WEAR IS "

FIG. 10D

COLOR SENSE

FIG. 10E

"COMBINATION OF GREEN WEAR WITH BLACK COLOR WILL GIVE A FEELING OF ELEGANCE"

FIG. 10F

CUTENESS ■■■■■■■□□□
SPORTINESS ■■■■□□□□□□
ELEGANCE ■■■■■■■■■■
PERSONALITY ■■■■■□□□□□

FIG. 10G

"COLOR COORDINATION OF CALM AND GENTLE IMAGE, MAKING OTHERS AT EASE."

FIG.12A
```
FIRST FEELING ?
 01 : CUTENESS
 02 : SPORTINESS
 03 : ELEGANCE
```

FIG.12B
```
SECOND FEELING ?
 01 : CUTENESS
 02 : SPORTINESS
 03 : ELEGANCE
```

FIG.12C
```
"CUTENESS/
ELEGANCE
COMBINATION IS
---"
```

FIG.12D

COLOR SENSE

FIG.12E
```
"BEST COLOR
COMBINATION
IS LIGHT BLUE
AND PINK"
```

FIG.12F
```
CUTENESS     ■■■■■■■■■□
SPORTINESS   ■■■■□□□□□□
ELEGANCE     ■■■■■■■■■■
PERSONALITY  ■■■■■■□□□□
```

FIG.12G
```
"COLOR COORDINATION
OF CALM AND
GENTLE IMAGE,
MAKING OTHERS
AT EASE"
```

( ):COLOR NUMBERS

FIG. 17A
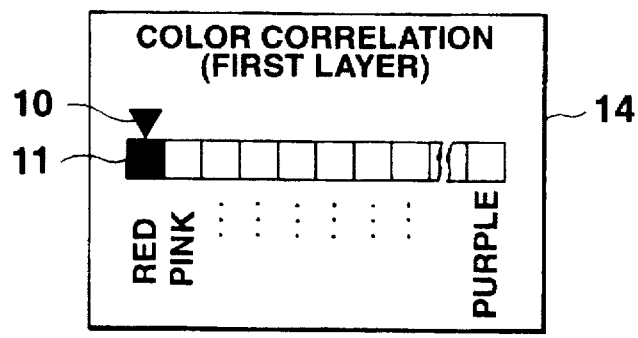
FIG. 17B
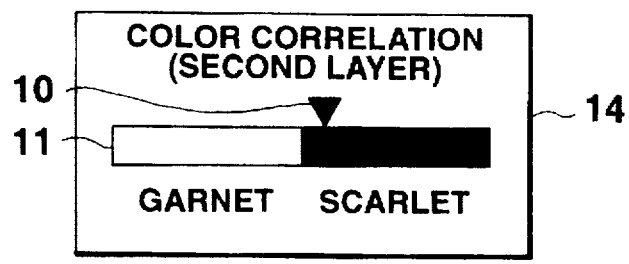
FIG. 17C
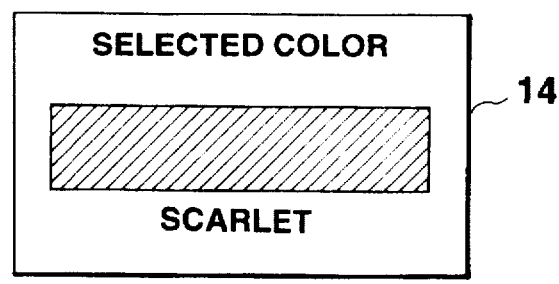
FIG. 18
| ADDRESSES \ COLOR NOS. | COLOR NOS. | COLOR INDICATIONS |
|---|---|---|
| R1 — 1 | 01 | RED |
| R2 — 2 | 01-2 | SCARLET |
| N | N-n | COLOR |
RAM 8

FIG.19

| ITEMS | PLACES | WEATHER | TIMES | COLOR DATA | EVALUATION |
|---|---|---|---|---|---|
| 1 | PARTY | FAIR | ALL DAY LONG | B < WHITE / RED | MALE 8 / FEMALE 7 |
| 2 | PARTY | FAIR | IN THE MORNING | C < WHITE / PURPLE | MALE 6 / FEMALE 5 |
| 3 | PARTY | FAIR | IN THE AFTERNOON | B < WHITE / BLACK | MALE 9 / FEMALE 8 |
| 4 | PARTY | FAIR | IN THE EVENING | E < GREY / PINK | MALE 9 / FEMALE 6 |
| 5 | PARTY | FAIR | EARLY IN THE MORNING | B < PURPLE / PURPLE | MALE 9 / FEMALE 4 |
| 6 | PARTY | CLOUDY | ALL DAY LONG | B < WHITE / PINK | MALE 6 / FEMALE 8 |
| 7 | PARTY | CLOUDY | IN THE MORNING | C < YELLOW / GREEN | MALE 9 / FEMALE 4 |
| 8 | PARTY | CLOUDY | IN THE AFTERNOON | B < WHITE / RED | MALE 5 / FEMALE 8 |

PLACES : PARTY(01),MOUNTAIN(02),BEACH(03),SCHOOL(04)
WEATHER : FAIR(01),CLOUDY(02),RAINY(03)
TIMES : ALL DAY LONG(01),IN THE MORNING(02),IN THE AFTERNOON(03),
　　　　IN THE EVENING(04),EARLY IN THE MORNING(05)
EVALUATION : A)CASUAL
　　　　　　　B)ELEGANT
　　　　　　　C)OF REMARKABLE PERSONALTY
　　　　　　　D)CUTE
　　　　　　　E)ANTIQUE

COLOR DATA DISPLAYING APPARATUS

This application is a Continuation of application Ser. No. 08/249,384, filed May 25, 1994, now abandoned.

BACKGROUND OF THE INVENTION

1. Field of the Invention

The present invention relates to a color data displaying apparatus for displaying data concerning colors.

2. Description of the Related Art

In general, a single color or plural colors in combination give impressions or feelings to observers in different ways.

Meanwhile, there are many occasions to need quick information concerning colors. For example, it is often necessary to determine what color is suitable for wear, personal effects and buildings, to appreciate what impression is given as a whole by plural colors in combination, or to determine what color is the most suitable to be combined with a certain color.

Conventionally, however, color information is not obtained easily and instantly in such occasions.

SUMMARY OF THE INVENTION

The present invention has been made to overcome the above mentioned inconvenience, and has an object to provide a color data displaying apparatus which provides several color information suitable for various occasions.

According to one aspect of the present invention, there is provided a color data displaying apparatus which comprises:

a memory for storing plural color data and plural evaluation data each corresponding to a combination of at least two of the plural color data;

designating means for designating at least two of the plural color data stored in said memory;

reading means for reading out evaluation data from said memory, which evaluation data corresponds to the combination of color data designated by said designating means; and display means for displaying the evaluation data read out by said reading means.

With the color data displaying apparatus with the above mention structure, when a given color data is designated among a plurality of color data, evaluation data on the designated color data is read out from the memory and is displayed on the display unit.

It would be apparent to those skilled in the art from the following description of preferred embodiments that the present invention may be modified in various manners and may be applicable to other apparatus.

BRIEF DESCRIPTION OF THE DRAWINGS

Other objects and structures of the present invention will be more fully understood from the description, when taken in conjunction with the accompanying drawings, in which:

FIG. 1 is a circuit diagram of a first embodiment of the present invention;

FIG. 2 is a view showing contents of a first converting table ROM;

FIG. 3 is a view showing contents of a second converting table ROM;

FIG. 4 is a view showing contents of a third converting table ROM;

FIG. 5 is a view showing contents of a fourth converting table ROM;

FIG. 6 is a view showing contents of a fifth converting table ROM;

FIGS. 10A–10G are views showing indications successively displayed in the second mode;

FIGS. 12A–12G are views showing indications successively displayed in the third mode;

FIGS. 17A–17C are views showing examples of indications;

FIG. 18 is a view showing data stored in RAM;

FIG. 19 is a view showing data stored in a converting table ROM, used in a third embodiment of the present invention;

DETAILED DESCRIPTION OF PREFERRED EMBODIMENTS

Figure 7:
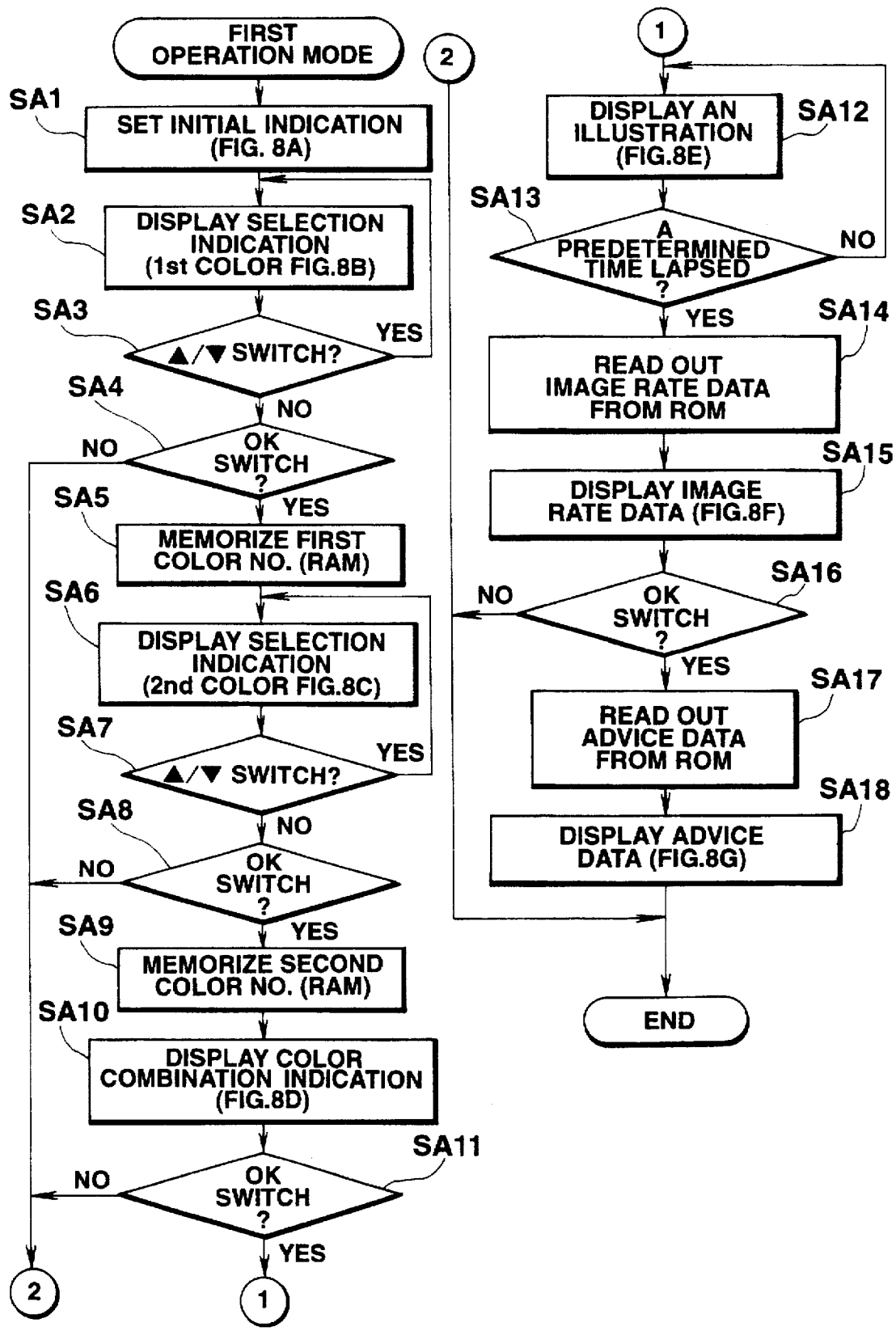
FIG. 7 is a flow chart of processes in a first mode.

Now, preferred embodiments of the present invention will be described in detail with reference to the accompanying drawings.

FIRST EMBODIMENT

A first embodiment of the invention will be described referring to FIGS. 1–14F.

FIG. 1 is a circuit diagram of the first embodiment of an electronic notebook according to the present invention.

As shown in FIG. 1, a switch input unit 1 includes an up-switch 2, a down-switch 3, an OK-switch 4 and a mode switch 5.

Operation data input to the switch input unit 1 is transferred to a central processing unit (CPU) 6. The CPU 6 controls not only a display unit 14 but whole operations of the electronic notebook in accordance with program data memorized in a read only memory (ROM) 7 and data temporarily stored in a random access memory (RAM) 8.

The mode switch 5 is operated to set one of operation modes, as will be described later.

The ROM 7 includes a program data ROM and first to fifth converting table ROMs 9–13. The program data ROM memorizes the program data and the first to the fifth converting table ROMs 9–13 memorize converting-table data shown in FIGS. 2–6, respectively.

More specifically, in the first converting table of the first converting table ROM 9 shown in FIG. 2, there are memorized 15 first color Nos. such as 01, 02, 03 and so on, and corresponding color indications such as "green", "light blue", "blue" and so on in the first column, and 15 second color Nos. and corresponding color indications in the first row. The color indication "green" represents a color "green" and similarly the color indication "blue" represents a color "blue". An image rate of evaluating a combination of a first color and a second color is memorized at a pertinent area in the first converting table. The image rate represents evaluation of a person in terms of feelings such as A: "cuteness", B: "sportiness", C: "elegance" and D: "personality". Each feeling is evaluated on the basis of 10 points.

In the second converting table of the second converting table ROM 10 shown in FIG. 3, there are memorized first color Nos. and corresponding color indications in the first column, and second color Nos. and corresponding color indications in the first row. An advice data is for advising on a combination of a first color and a second color, and is memorized at a pertinent area in the second converting table. The advice data memorized in the first and second converting table ROMs 9, 10 are used in a first to fourth modes, as will be described later.

Data memorized in the third converting table ROM 11 of FIG. 4 are used only in the second mode. In the third converting table of the third converting table ROM 11, there are memorized 15 first color Nos. and corresponding color indications in the first column, and four feelings Nos. and corresponding feelings: "cuteness", "sportiness", "elegance" and "personality" in the first row. A color which represents the feeling memorized in the first row when combined with a color represented by a pertinent color indication memorized in the first column is memorized at a pertinent area in the third converting table. More specifically, the third converting table teaches that a color which can represent a feeling of "cuteness" when combined with a color "green" is "yellow", and a color which can represent "personality" when combined with a color "dark blue" is "purple".

Data memorized in the fourth converting table ROM 12 of FIG. 5 are used only in the third mode. In the fourth converting table of the fourth converting table ROM 12, there are memorized four first feeling Nos. and corresponding feelings: "cuteness", "sportiness", "elegance" and "personality" in the first column, and four second feeling Nos. and corresponding feelings: "cuteness", "sportiness", "elegance" and "personality" in the first row. Plural combinations of colors which represent a combined feeling of a first feeling and a second feeling are memorized at a pertinent area in the fourth converting table.

Data memorized in the fifth converting table ROM 13 of FIG. 6 are used only in the fourth mode. In the fifth converting table of the fourth converting table ROM 13, there are memorized 15 first color Nos. and corresponding first color indications in the first column, and 15 second color Nos. and corresponding second color indications in the first row. An evaluation value for a combination of a first and a second colors is memorized at pertinent areas in the fifth converting table. The fifth converting table shows that the higher the evaluation value is, the more pertinent the combination of the first and the second colors is. For example, the fifth converting table shows that a color "green" obtains the highest evaluation value "30", when combined with a color "dark blue". That is, the fifth converting table teaches that a color "dark blue" is the most pertinent color to be combined with a color "green".

Now, operation of the first embodiment with the above structure will be described with respect to the first to fourth modes, which are set by operation of the mode switch 5.

First Operation Mode

When the first mode is set, the CPU 6 performs processes in accordance with the flow chart of FIG. 7.

Figure 8A:
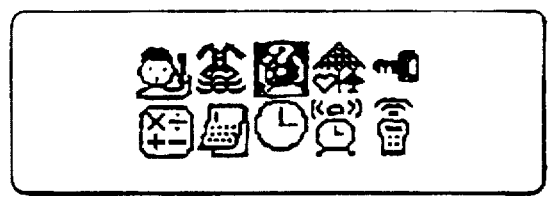
FIGS. 8A–8G are views showing indications successively displayed in the first mode.
Figure 8B:
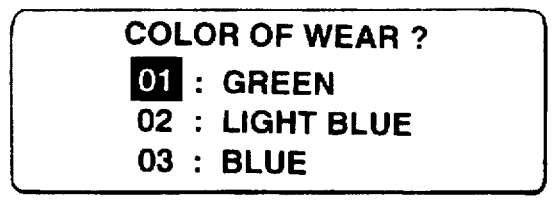

At first, the CPU 6 performs an initial setting indication process in step SA1, displaying an initial setting indication on the display unit 14, as shown in FIG. 8A. Then, the CPU 6 performs in step SA2 a selecting process, displaying a selection indication for selecting a first color. In the selecting process of step SA2, an indication "color of wear?", color Nos. and corresponding color indications are displayed on the display unit 14. 15 colors represented by the color Nos. 1–15 are prepared and set for selecting a first color. While either the up-switch 2 or the down-switch 3 is operated in step SA3, the loop operation from step SA2 through step SA3 to step SA2 is executed. As a result, the color Nos., corresponding color indications and a cursor C are displayed on the display unit 14 in a scrolling manner. When the cursor C comes on the desired color No, and when the up-switch 2 or the downswitch 3 is released, and the OK-switch 4 is operated, the operation advances from step SA3 through step SA4 to step SA5, where the desired first color No. is memorized in a predetermined area of RAM 8.

Figure 8C:
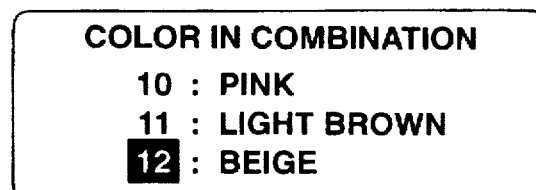

The CPU 6 executes a process in step SA6 to display a selection indication for selecting a second color. In the process of step SA6, an indication "color in combination?", second color Nos. and corresponding color indications are displayed on the display unit 14. 15 colors represented by color Nos. 1–15 are prepared and set for the second color. While either the up-switch 2 or the down-switch 3 is operated in step SA7, the loop operation from step SA6 through step SA7 to step SA6 is performed. As a result, the color Nos., corresponding color indications and the cursor C are displayed on the display unit 14 in a scrolling manner (FIG. 8C). When the cursor C comes on the desired color No, and when the up-switch 2 or the down-switch 3 is released, and the OK-switch 4 is operated, the operation advances from step SA7 through step SA8 to step SA9, where the desired second color No. is memorized in a predetermined area of RAM 8.

Figure 8D:
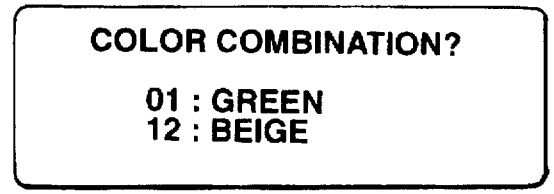
Figure 8E:
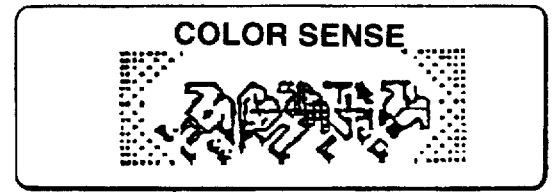

Then, an indication of a combination of a first and a second colors is displayed in step SA10. As shown in FIG. 8D, an indication "color combination?", two selected color Nos. and two corresponding color designations (01: "green", 12: "beige") are displayed on the display unit 14. When, confirming the color combination displayed on the display unit 14, a user operates the OK-switch 4, the operation goes from step SA11 to step SA12, where an illustration displaying process is performed. In the illustration displaying process of step SA12, a predetermined illustration shown in FIG. 8E is displayed on the display unit 14. The illustration is displayed for a predetermined time period, for example, for one second. When the predetermined time duration has lapsed, the operation advances from step SA13 to step SA14, where colorcombination data is read out from the first converting table ROM 9 based on the memorized color Nos.

Figure 8F:
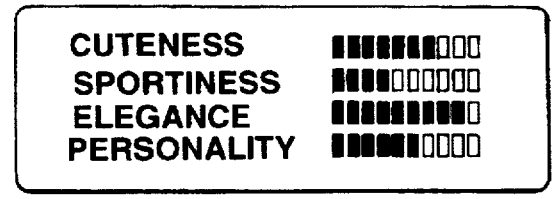

As described above, in the first converting table of the first converting table ROM 9 are memorized image rate data of evaluating a combination of a first color and a second color in terms of feelings: A: "cuteness", B: "sportiness", C: "elegance" and D: "personality" on the basis of 10 points, as shown in FIG. 2. Image rate data for a combination of a first and second colors is read out from the first converting table ROM 9 of the ROM 7 in step SA14, and the read out image rate data is displayed on the display unit 14 in step SA15, as shown in FIG. 8F. On the display unit 14, indications "cuteness", "sportiness", "elegance" and "personality" and segmented indications representing the corresponding evaluating values "7", "4", "9" and "6" are displayed.

Figure 8G:
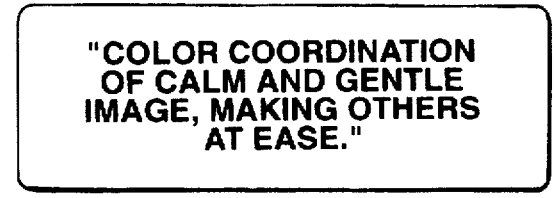

When the user has confirmed the indications displayed on the display unit 14, and operates the OK-switch 4 in step SA16, the CPU 6 reads out the corresponding advice data from the second converting table ROM 10 in step SA17. As described above referring to FIG. 3, advice data of advising for a combination of a first color and a second color are memorized in the second converting table ROM 10 of the ROM 7. In step SA17, the advice data of advising for a combination of a first color and a second color (for example, "green" and "beige") is read out from the second converting table ROM 10. The read out advice data is displayed on the display unit 14 in step SA18, as shown in FIG. 8G. The displayed advice data reads as follows: "a color coordination of calm and gentle image, making others at ease".

Second Operation Mode

Figure 9:
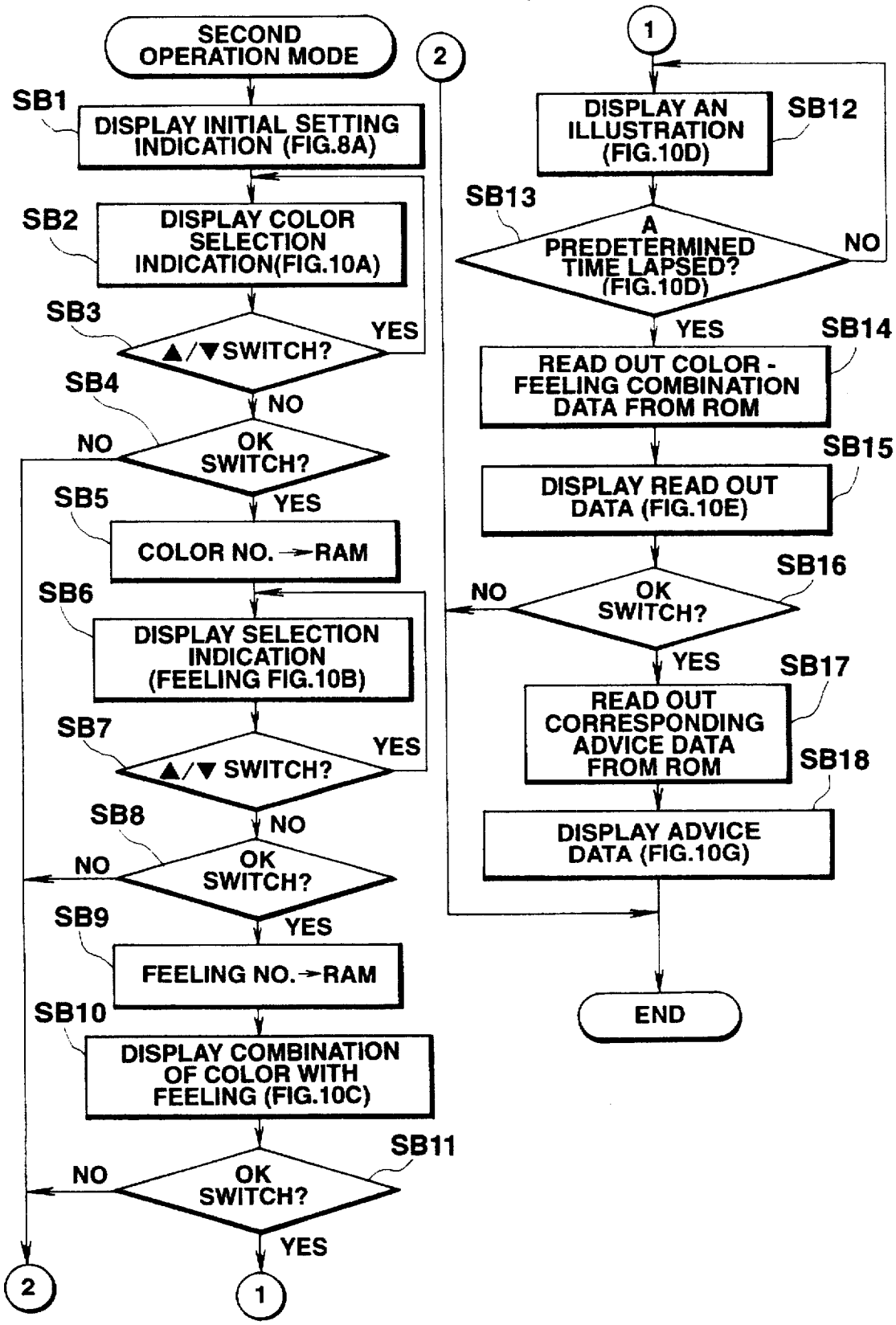
FIG. 9 is a flow chart of processes in a second mode.

When the first mode is set, the CPU 6 performs processes in accordance with the flow chart of FIG. 9.

At first, the CPU 6 performs an initial setting indication process in step SB1, displaying an initial setting indication on the display unit 14, as shown in FIG. 8A. Then, the CPU 6 performs in step SB2 a selecting process, displaying a selection indication for selecting a color. In the selecting process of step SB2, an indication "color of wear?", color Nos. and corresponding color indications are displayed on the display unit 14 (FIG. 10A).

15 colors with the color Nos. 1–15 are prepared and set for the selecting process of a color. While either the up-switch 2 or the down-switch 3 is operated in step SB3, the loop operation from step SB2 through step SB3 to step SB2 is executed. As a result, 15 color Nos., corresponding color indications and a cursor C are displayed on the display unit 14 in a scrolling manner. When the cursor C comes on the desired color No. and when the up-switch 2 or the down-switch 3 is released, and the OK-switch 4 is operated, the operation advances from step SA3 through step SA4 to step SA5, where the selected color No. is memorized in a predetermined area of RAM 8.

The CPU 6 executes a process in step SB6 to display a selection indication for selecting a feeling. In the process of step SB6, an indication "feeling?", feeling Nos. and corresponding feeling indications are displayed on the display unit 14 as shown in FIG. 10B. Four feelings "cuteness", "sportiness", "elegance" and "personality" represented by feeling Nos. 01–04 are prepared and set for selecting a feeling. While either the up-switch 2 or the down-switch 3 is operated in step SA7, the loop operation from step SB7 through SB6 to step SB7 is performed. As a result, the feeling Nos., corresponding feelings and the cursor C are displayed on the display unit 14 in a scrolling manner. When the cursor C comes on the desired feeling No. and when the up-switch 2 or the down-switch 3 is released, and the OK-switch 4 is operated, the operation advances from step SB7 through step SB8 to step SB9, where the desired feelings No. is memorized in a predetermined area of RAM 8.

Then, an indication of a combination of the selected color and feeling is displayed in step SB10. As shown in FIG. 10C, an indication "elegant combination with a green wear . . . " is displayed on the display unit 14. When the user confirms the combination displayed on the display unit 14 and operates the OK-switch 4, the operation goes from step SB11 to step SB12, where a predetermined illustration as shown in FIG. 10D is displayed on the display unit 14 for a predetermined time period, for example, for one second. When the predetermined time duration has lapsed, the operation advances from step SB13 to step SB14, where color-feeling combination data is read out from the third converting table ROM 11 based on the memorized color No. and feeling No.

As described above, at pertinent areas in the third converting table of the third converting table ROM 11 of FIG. 4 are memorized colors which can give feelings memorized in the first row when combined with a color memorized in the first column. According to the third converting table of the third converting table ROM 11 of FIG. 4, a color which can give a feeling of "elegance" when combined with a color "green" is "black". Therefore, a color "black" is read out from the third converting table ROM 11 in step SB14, and in the following step SB15 a resultant data: "Combination of a green wear with a black color will give a feeling of elegance." is displayed, as shown in FIG. 10E.

The above indication is displayed on the display unit 14 for a predetermined time in step SB15, and then an image rate for the combination of colors "green" and "black" is read out from the first converting table ROM 9. The read out image rate is displayed on the display unit 14. As a result, feeling indications "cuteness", "sportiness", "elegance" and "personality" together with segmented indications representing the corresponding evaluating values "7", "4", "10" and "6" are displayed on the display unit 14 as shown in FIG. 10F.

When the user has confirm the indication displayed on the display unit 14 and operates the OK-switch 4, the CPU 6 reads out the corresponding advice data from the second converting table ROM 10 in step SB17, and displays the read out advice data on the display unit 14 in step SB18. In step SB7, a message "Color coordination of calm and gentle image, making others at home" is displayed as shown in FIG. 10G.

In the present embodiment, the user inputs his desirous color and feeling and the apparatus indicates colors to be combined on the display unit 14. The apparatus, however, may be modified to indicate colors to be combined based on a desirous color and season or a desirous color and time which are input by the user.

Third Operation Mode

Figure 11:
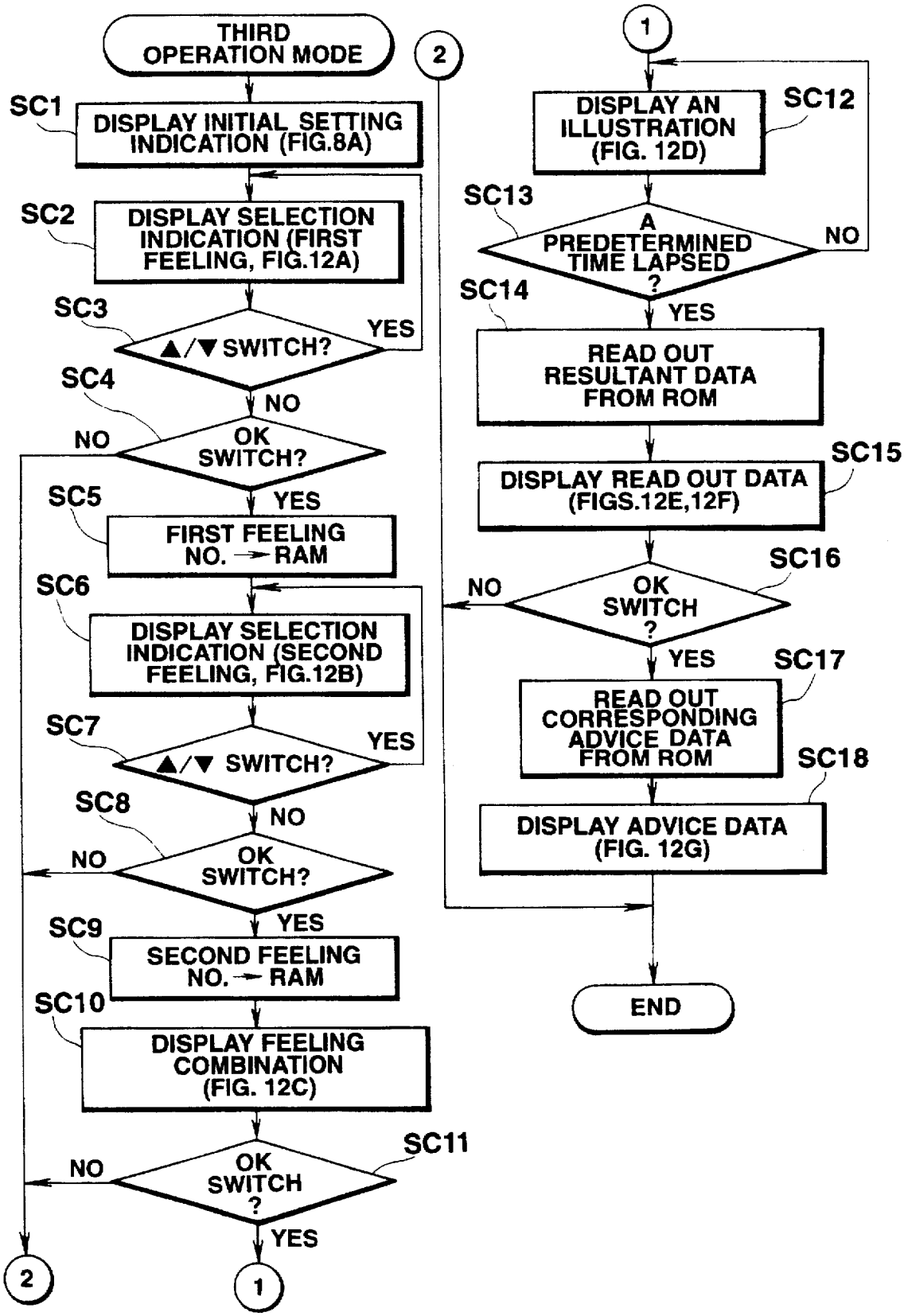
FIG. 11 is a flow chart of processes in a third mode.

When the first mode is set, the CPU 6 performs processes in accordance with the flow chart of FIG. 11.

At first, the CPU 6 performs an initial setting indication setting process in step SC1, displaying an indication on the display unit 14, as shown in FIG. 8A. Then, the CPU 6 performs in step SC2 a selecting process, displaying a selection indication for selecting a first feeling. In the selecting process of step SC2, an indication "feeling?", feeling Nos. and corresponding feeling indications are displayed on the display unit 14.

Four feelings such as "cuteness", "sportiness", "elegance" and "personality" with the feeling Nos. 01–04 are prepared and set for selecting a first feeling, as shown in FIG. 12A. While either the up-switch 2 or the down-switch 3 is operated in step SB3, the loop operation from step SC3 through step SC2 to step SC3 is executed. As a result, four feeling Nos., corresponding feeling indications and a cursor C are displayed on the display unit 14 in a scrolling manner. When the cursor C comes on the desired feeling No. and when the up-switch 2 or the down-switch 3 is released, and the OK-switch 4 is operated, the operation advances from step SC3 through step SC4 to step SC5, where the selected first feeling No. is memorized in a predetermined area of RAM 8.

The CPU 6 executes a process in step SC6 to display a selection indication for selecting a second feeling. In the process of step SC6, an indication "feeling?", feeling Nos. and corresponding feeling indications are displayed on the display unit 14 in a similar manner as described above, as shown in FIG. 12B. While either the up-switch 2 or the down-switch 3 is operated in step SA7, the loop operation from step SC7 through SC6 to step SC7 is performed. When the cursor C comes on the desired feeling No, and when the up-switch 2 or the down-switch 3 is released, and the OK-switch 4 is operated, the operation advances from step SC8 to step SB9, where the selected second feelings No. is memorized in a predetermined area of RAM 8.

Then, an indication of a combination of the selected feelings is displayed in step SB10. As shown in FIG. 12C, an indication "Cuteness/elegance combination is . . . " is displayed on the display unit 14. When the user has confirmed the cuteness/elegance combination displayed on the display unit 14 and operates the OK-switch 4, the operation goes from step SC11 to step SC12, where a predetermined illustration as shown in FIG. 12D is displayed on the display unit 14 for a predetermined time period, for example, for one second. When the predetermined time duration has lapsed, the operation advances from step SC13 to step SC14, where color combination data is read out from the fourth converting table ROM 12 based on the memorized feeling Nos.

As described above, in the fourth converting table of the fourth converting table ROM 12 of FIG. 5 there are memorized four first feelings in the first column and second feelings of the same kind are memorized in the first row. Further, at a pertinent area in the fourth converting table are memorized plural combinations of colors which, when combined, can give the combined feeling of the first and second feelings memorized in the first row and the first column. According to this fourth converting table, combinations of colors which, when combined, can give a feeling of "elegance" and "cuteness" are "light blue and pink", "dark blue and pink" and "yellow and white".

Therefore, three combinations of colors are read out from the fourth converting table ROM 12 in step SC14, and a resultant data, i.e., a message for the first color combination "light blue and pink": "The best color combination is light blue and pink" is displayed in the following step SC15, as shown in FIG. 12E. Similarly, messages for the following color combinations "dark blue and pink" and "yellow and white" are displayed at predetermined intervals.

Then, image rates for the color combinations are read out from the first converting table ROM 9, and the read out image rates are displayed on the display unit 14. As a result, feeling indications "cuteness", "sportiness", "elegance" and "personality" together with segmented indications representing the corresponding evaluating values "9", "4", "10" and "6" are displayed on the display unit 14 as shown in FIG. 12F.

When the user has confirmed the indication displayed on the display unit 14 and operates the OK-switch 4, the CPU 6 reads out the corresponding advice data from the second converting table ROM 10 in step SC17, and displays the read out advice data on the display unit 14 in step SC18. In step SC17, a message "Color coordination of calm and gentle image, making others at ease" is displayed as shown in FIG. 12G.

Fourth Operation Mode

Figure 13:
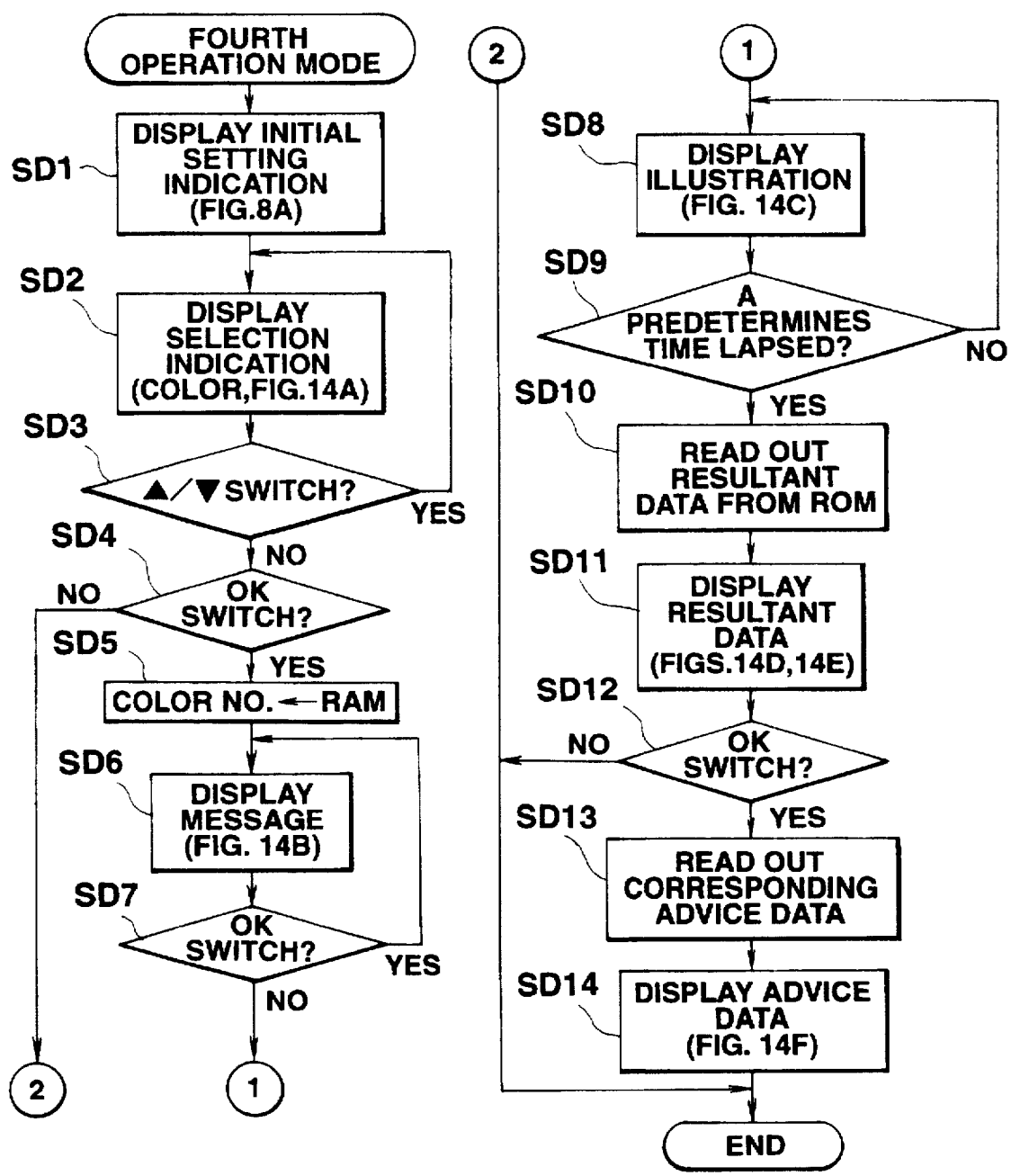
FIG. 13 is a flow chart of processes in a fourth mode.

When the fourth mode is set, the CPU 6 performs processes in accordance with the flow chart of FIG. 13.

Figure 14A:
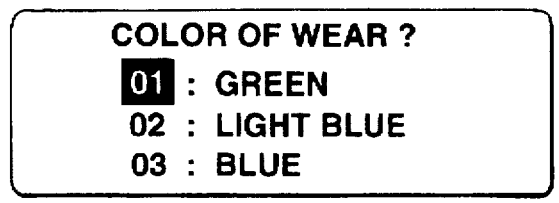
FIGS. 14A–14F are views showing indications successively displayed in the fourth mode.

At first, the CPU 6 performs an initial setting indication process in step SD1, displaying an initial setting indication on the display unit 14, as shown in FIG. 8A. Then, the CPU 6 performs in step SD2 a selecting process, displaying a selection indication for selecting a color. In the selecting process of step SD2, an indication "color of wear?", color Nos. and corresponding color indications are displayed on the display unit 14, as shown in FIG. 14A. 15 colors represented by the color Nos. 1–15 are prepared and set for selecting a color. While either the up-switch 2 or the down-switch 3 is operated in step SD3, the loop operation from step SD3 through step SD2 to step SD3 is executed. As a result, the color Nos., corresponding color indications and a cursor C are displayed on the display unit 14 in a scrolling manner. When the cursor C comes on the desired color No, and when the up-switch 2 or the down-switch 3 is released, and the OK-switch 4 is operated, the operation advances from step SD3 through step SD4 to step SD5, where the selected color No. is memorized in a predetermined area of RAM 8.

Figure 14B:
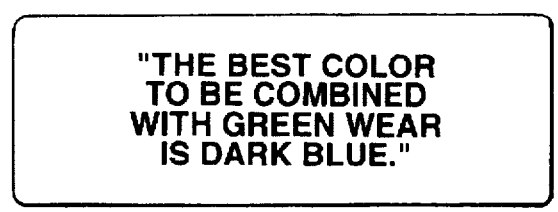

The CPU 6 executes a process to display a selected color indication in step SD6. In the process of step SD6, an indication (a message), "The best color combined with the green wear is dark blue" is displayed on the display unit 14 as shown in FIG. 14B.

Figure 14C:

When, confirming the selected color on the display unit 14, a user operates the OK-switch 4, the operation goes from step SD7 to step SD8, where an illustration indication process is performed. In the illustration indication process of step SD8, a predetermined illustration shown in FIG. 14C is displayed on the display unit 14. The illustration is displayed for a predetermined time period, for example, for one second. When the predetermined time period has lapsed, the operation advances from step SD9 to step SD10, where resultant data is read out from the fifth converting table ROM 13 based on the memorized color Nos.

Figure 14D:
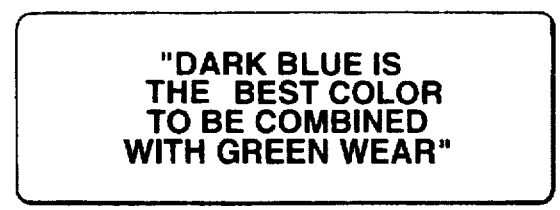
Figure 14E:
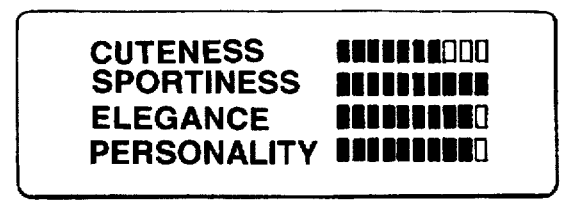

As described above, in the fifth converting table of the fifth converting table ROM 9, there are memorized 15 color numbers and corresponding color indications in the first column and row. Image rate data of evaluating a combination of a first color and a second color are memorized at pertinent areas in the fifth converting table. The converting table teaches that the higher the image rate is, the better the combination of the designated colors is. For example, a best color to be combined with a designated color "green" is "dark blue", which is given the highest image rate "30". The color "dark blue" is read out from the fifth converting table ROM 13 in step SD10, and a resultant data, i.e., a message "Dark blue is the best color to be combined with green wear" is displayed on the display unit 14 in step SD11, as shown in FIG. 14D.

Image rate data for a combination of the two colors is read out from the first converting table ROM 9 of the ROM 7 in step SD11, and the read out image rate data is displayed on the display unit 14. On the display unit 14, indications "cuteness", "sportiness", "elegance" and "personality" and segmented indications representing the corresponding evaluating values "7", "10", "9" and "9" are displayed.

Figure 14F:
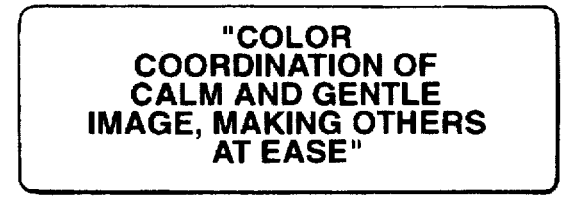
Figure 15:
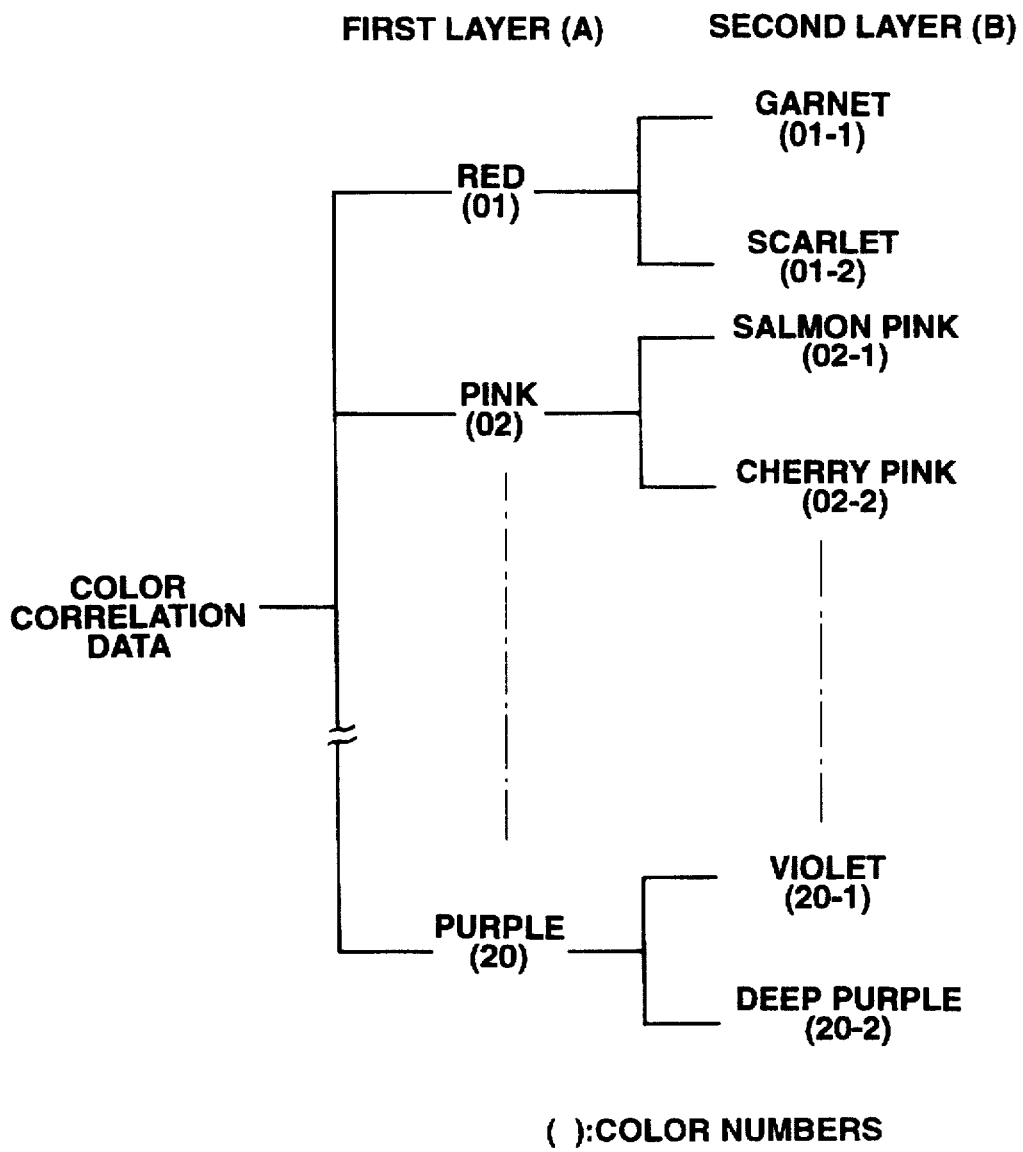
FIG. 15 is a view showing contents of correlation data between colors stored in ROM, used in a second embodiment of the present invention.

When the user has confirmed the indications displayed on the display unit 14, and operates the OK-switch 4, the CPU 6 reads out the corresponding advice data from the second converting table ROM 10 in step SD13. The read out advice data shown in FIG. 14F is displayed on the display unit 14 in step SD14.

In the present embodiment as have been described above, data concerning colors are previously memorized, and evaluation for a color combination and a color combination giving a particular feeling are displayed on the display unit. And further, a best color which is combined with a particular color is displayed on the display unit. The data displayed on the display unit gives a particular advice concerning colors and is conveniently used by a user, who has to go out urgently.

SECOND EMBODIMENT

A second embodiment of the present invention will be described with reference to FIGS. 15–18.

In the second embodiment, like reference numerals represent like elements of the first embodiment and a further description will be omitted.

The second embodiment is provided with the same ROM as the ROM 7 of FIG. 1. More specifically, in the ROM 7 of the second embodiment are memorized the above program data and color correlation data. The color-correlation data is of structure of double layers (a first layer (A) and a second layer (B)). We presume that 20 sorts of colors such as "red", "pink", "purple" and so on are referred to as basic colors, and are represented by basic color indications. Further, colors which have the same attribute as the basic color are referred to as finely classified colors, and are represented by finely-classified color indications. In the first layer (A) are memorized 20 basic color indications with color numbers 01–20, such as red (01), pink (02), . . . purple (20). In the second layer (B) are memorized finely-classified color indications with color numbers. For example, finely-classified color indications with color numbers such as garnet (01-1) and scarlet (01-2) are memorized in the second layer (B) in correspondence with the basic color indication, red (01), memorized in the first layer (A). The basic color and the finely-classified colors which have the same attribute as the basic color have common color number. That is, colors which are given a common color number have the same attribute. For example, both the garnet (01-1) and the scarlet (01-2) include a common number 01, which is given to the color red, too. Therefore, the colors "garnet" and "scarlet" have the same attribute as the "red" with the color number (01).

Figure 16:
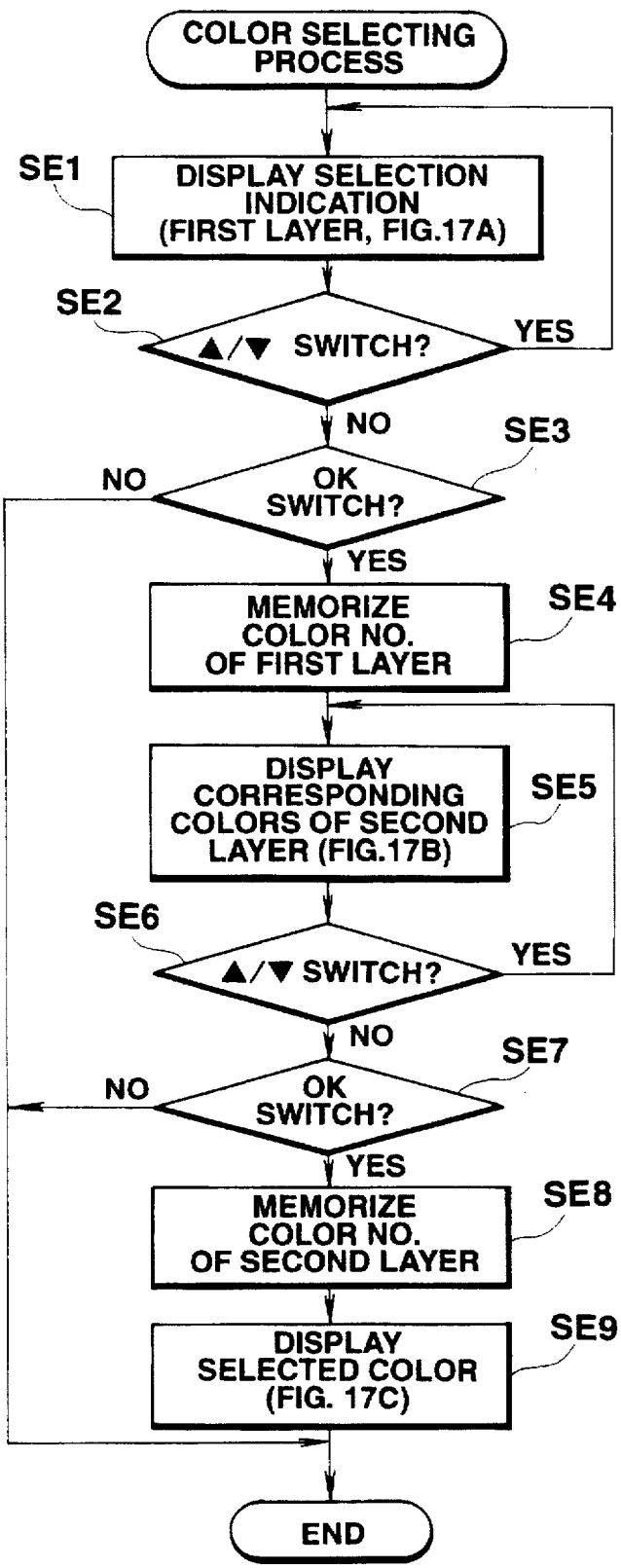
FIG. 16 is a flow chart of processes in the second embodiment.

Now, the process of the second embodiment with the above structure will be described with reference to the flow chart of FIG. 16.

A color selection mode is set by operation of the mode switch 5. Then, the CPU 6 starts operation in accordance with the flow chart of FIG. 16, and displays data memorized in the first-layer indication in step SE1. In the process of step SE1, a part of the color indications of the first layer (A) of FIG. 15 and an indication of "Color Correlation (first layer)" are displayed on the display unit 14, as shown in FIG. 17A. (In this case, all the color indications of the first layer (A) may be displayed.) Then, every time the user operates either the up-switch 2 or the down-switch 3 in step SE2, the operation goes back to step SE1. And the 20 color indications of the first layer (A) are displayed in a scrolling manner, and the cursor 10 is also displayed. When the cursor 10 comes to a desired color indication and the up-switch 2 or the down-switch 3 is released, and when the user operates the OK-switch 4, the operation advances from step SE2 through step SE3 to step SE4, where the desired color indication and the color number are read out from the ROM 7 and are memorized in the RAM 8 at a predetermined area R1. A square indication 11 corresponding to the color indication memorized in the RAM 8 turns black from white (refer to FIG. 17A).

Then, finely-classified color indications of the second layer (B) having the same attribute as or correlation with the color indication of the first layer (A) memorized in the RAM 8 are read out from the ROM 7 and displayed on the display unit in step SE5. More specifically, for example, when the color indication of "red" of the color number "01" is selected from among the color indications of the first layer (A) and memorized in the RAM 8, the finely-classified color indications "garnet" and "scarlet" having the same attribute as or correlation with the color indication "red" and an indication of "Color Correlation (second layer)" are displayed on the display unit 14, as shown in FIG. 17B. In this way, finely-classified colors having correlation with the color "red" are displayed on the display unit 14 in step SE5.

When either the up-switch or the down-switch is operated while the finely-classified color indications of the second layer (B) are on display, the processes of steps SE5 and SE6 are repeatedly executed to move the cursor 10 within the indications on the display unit 14. When the cursor 10 comes on a desired finely-classified color indication, the up-switch or the down-switch is released and the OK-switch is operated. Then, the operation advances from step SE6 through step SE7 to step SE8, where selected finely-classified color designation of the second layer (B) and the color number are memorized in the RAM 8 at a predetermined area R2, and a square indication 11 corresponding to the memorized finely-classified color indication turns black from white (refer to FIG. 17B). Thereafter, the selected finely-classified color indication of the second layer (B) memorized in step SE8 and an indication of "Selected Color" are displayed on the display unit 14, as shown in FIG. 17C. Therefore, the user can clearly discriminate a color from other colors of the same attribute and can confirm his really desired color on the display unit 14.

In the second embodiment, color correlation of the first and second layers (A), (B) are memorized in the ROM 7, but the colors may be classified into two and more layers for searching a desired color more precisely. In the present embodiment, a color is searched through colors of the same attribute but may be searched through similar colors, colors of a complementary attribute, colors of an opposite attribute and colors of an intermediate attribute.

As described above, in the second embodiment, a color to be designated and plural colors having correlation with the color to be designated are previously memorized in a memory with a predetermined relationship. When a color is designated, the colors having correlation with the designated color are read out from the memory and displayed on a display device. Accordingly, those who have no knowledge about color correlation can search a color through finely classified colors to discriminate the color from other colors having the same attribute or to precisely designate express a desired color.

THIRD EMBODIMENT

A third embodiment of the present invention will be described with reference to FIGS. 19≧21.

In the third embodiment, like reference symbols represent like elements of the first embodiment and detailed description thereof will be omitted.

The third embodiment is provided with ROM 7 which is the same as the ROM 7 of the first embodiment. The ROM 7 of the third embodiment includes a program data ROM and a converting table ROM 15 shown in FIG. 19.

In the converting table ROM 15, there are provided 60 rows for storing 60 combination numbers 1–60 and five columns for storing five items: "places", "weather", "times", "color data" and "evaluation". The combination numbers represent combinations of three items: "place", "weather" and "time". In the column of "places" for each combination number is memorized any one of "party 01", "mountain 02", "beach 03" and "school 04". In the column for "weather" is memorized any one of "fair 01", "cloudy 02" and "rainy 03". In the column of "times" for each combination number is memorized any one of "party 01", "mountain 02", "beach 03" and "school 04". In the column of "times" for each combination number is memorized any one of "all day long 01", "in the morning 02", "in the afternoon 03", "in the evening 04" and "early in the morning". The combinations of three items: "places", "weather" and "times" are different from one other. Combination of four different places, three weathers and five times makes 60 combinations (4×3×5= 60). Combination numbers 1–60 are stored in a first column of the converting table ROM 15, and the above 60 combinations are stored in pertinent areas in correspondence with the numbers 1–60 in the first column.

In the column of "color data" for each combination number is stored a combination of colors of wear suitable for the "place", "weather" and "time" stored in a pertinent row, and further evaluation, A to E, for such combination of colors. The evaluation A to E represent following senses:

Evaluation A: casual
Evaluation B: elegant
Evaluation C: of remarkable personality
Evaluation D: cute
Evaluation E: antique In the column of "evaluation" for each combination number are stored evaluation by a male and a female for the corresponding combination of colors of wear stored in the pertinent area in the column of "color data". The evaluation is made on the basis of 10 points.

Figure 20:
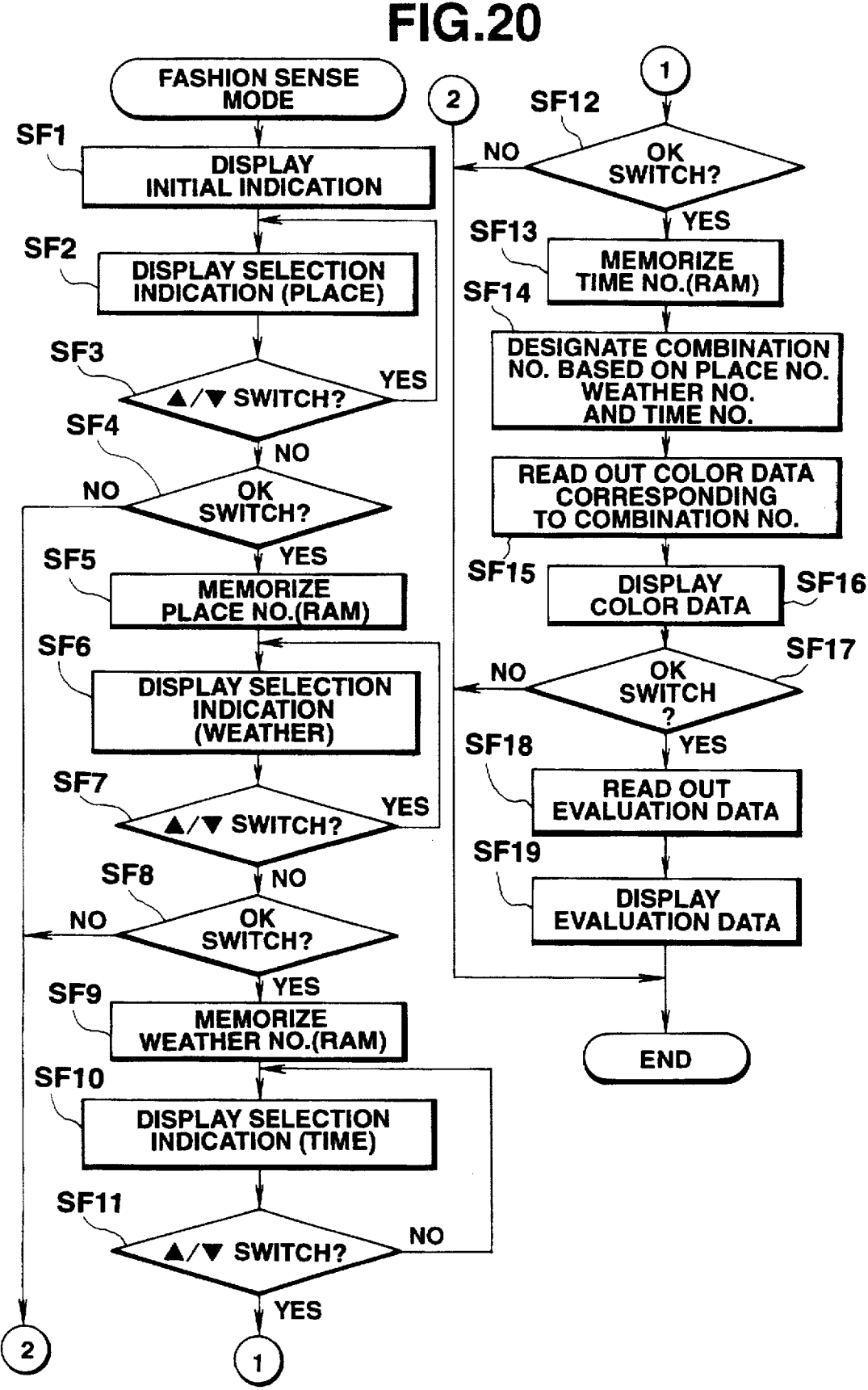
FIG. 20 is a flow chart of processes in the third embodiment.
Figure 21:
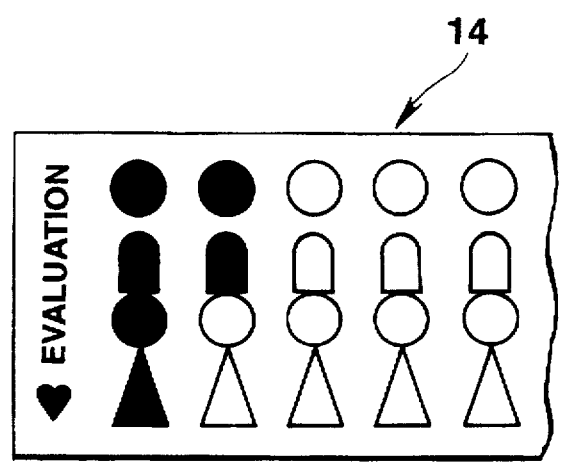
FIG. 21 is a view showing an example of an indication representative of evaluation.

Now, operation of the third embodiment with the above mentioned structure will be described in accordance with the flow chart of FIG. 20.

At first, a fashion sense mode is set by operation of the mode switch 5. In the fashion sense mode, the CPU 6 works in accordance with the flow chart of FIG. 20.

In step SF1, the CPU 6 executes an initial indication process, where image data are read out from the ROM 15 and are displayed on the display unit 14, i.e., an initial indication of the fashion sense mode is displayed.

Then, the CPU 6 executes in step SF2 a selection indication process to display a selection indication for selecting a place on the display unit 14. On the display unit 14 are displayed the places "party 01", "mountain 02", "beach 03" and "school 04" together with the above indication, which are necessary for selecting a place to go. While the up-switch 2 or down-switch 3 is repeatedly operated, the CPU 6 executes a loop operation in steps SF3, SF2, SF3, where four places with place numbers together with the cursor are displayed on the display unit in a scrolling fashion. When the cursor comes on the desired place number, and when the up-switch 2 or the down-switch 3 is released and the OK-switch 4 is operated, the operation advances from step SF3 through step SF4 to step SF5, where the desired place number is memorized in a predetermined area of RAM 8.

The CPU 6 executes a process in step SF6 to display a selection indication for selecting weather. In the process of step SF6, conditions for selecting weather: "fair 01", "cloudy 02", and "rainy 03" are displayed on the display unit 14. While either the up-switch 2 or the down-switch 3 is operated in step SF7, the loop operation from step SF6 through step SF7 to step SF6 is performed. As a result, three weather conditions with the weather numbers and the cursor are displayed on the display unit 14 in a scrolling manner. When the cursor comes on the weather number, and when the up-switch 2 or the down-switch 3 is released, and the OK-switch 4 is operated, the operation advances from step SF7 through step SF8 to step SF9, where the selected weather number is memorized in a predetermined area of RAM 8.

Then, a selection indication for selecting a time is displayed in step SF10. In step SF10, times "all day long 01", "in the morning 02", "in the afternoon 03", "in the evening 04" and "early in the morning" are displayed on the display unit 14. While either the up-switch 2 or the down-switch 3 is operated in step SF11, the loop operation from step SF11 through step SF10 to step SF11 is performed. As a result, the above five times with time numbers are displayed on the display unit 14 in a scrolling manner. When the cursor comes on the time to be designated, and when the up-switch 2 or the down-switch 3 is released, and the OK-switch 4 is operated, the operation advances from step SF11 through step SF12 to step SF13, where the time number corresponding to the designated time is memorized in a predetermined area of RAM 8.

A combination number is searched through the RAM 8 based on the place number, the weather number and the time number memorized in the RAM 8. More specifically, if the place "party 01", the weather "fair 01" and the time "all day long 01" have been memorized in the RAM 8, a combination number corresponding to the data memorized in the RAM 8 is "1" in the converting table ROM 15 of FIG. 1, and the combination number "1" is designated. Further, if the place "party 01", the weather "cloudy 02" and the time "in the morning 02" have been memorized in the RAM 8, a combination number corresponding to the data memorized in the RAM 8 is "7" in the converting table ROM 15, and the combination number "7" is designated.

When the combination number has been searched out, color data corresponding to the designated combination number are read out from the ROM 15 in step SF15 and are displayed on the display unit 14 in step SF16. As described above, when, for instance, the combination number "1" is designated, the corresponding color data "B, white, red" is read out from the ROM 15 and is displayed on the display unit 14. Further, when the combination number "7" is designated, the corresponding color data "C, yellow, green" is read out from the ROM 15 and is displayed on the display unit 14. Therefore, confirming the color data on the display unit 14, the user can understand the color combination of wear which is the most elegant for the previously input data, and further can confirm evaluation of the color data in terms of B: "elegance" and C: "personality".

When the user operates the OK-switch 4 after confirming the color combination and the evaluation of the color data, the operation advances from step SF17 to step SF18, where the CPU 6 reads out evaluation data from the column of "evaluation" of the converting table in the ROM 15. As described above, in the evaluation column of the converting table of the ROM 15 are memorized evaluation data which are made by a male and a female for every combination number and are expressed on the basis of 10 points, as shown in FIG. 19. In step SF18, evaluation data made by a male and a female for the designated combination data, and the read out evaluation data are displayed on the display unit 14 in step SF19. The evaluation data are represented by turned off male signs (at upper portion) and turned off female signs (lower portion) on the display unit 14. The user can understand evaluation made by a male and a female on the color combination of the wear from the number of the turn off male and female signs.

In the third embodiment, "place", "time" and "weather" are used as elements for determining the fashion. But elements other than the above elements may be used. For example, purposes of going out, seasons, temperatures which have the effect upon the fashion may be included as elements for determining the fashion. Further, if it is taken into consideration to determine the fashion whether the user goes out on a mournful or joyous occasion, the more useful fashion data may be obtained.

As have been described above, in the third embodiment, fashion data for various conditions have been previously memorized, and particular fashion data for a designated condition are read out and displayed on the display unit. Therefore, even in a hurry, the user can get particular fashion data depending on occasions. Since the fashion data are displayed together with evaluation data, the user can go out without any anxiety about his fashion upon confirming the displayed evaluation data.

What is claimed is:

1. A display control apparatus comprising:

a memory which contains data on a plurality of groups of predetermined impression items and a corresponding plurality of groups of numerical data, each group of numerical data representing a corresponding group of weights of impressions given by a respective one of a plurality of combinations of two colors;

a designating section for designating names of two colors to be combined;

a first display control section for displaying a list of names of colors;

a reader section, responsive to said designating section designating the names of two colors to be combined from the displayed list of names of colors, for reading out for a corresponding group of predetermined impression items from said memory a group of numerical data representing a corresponding group of weights of impressions given by a combination of the two colors of the designated names; and a second display control section for displaying in corresponding relationship a group of graphs representing the corresponding group of numerical data read by said reader section and a corresponding group of character indications which indicate the corresponding group of predetermined impression items.

2. A display control apparatus according to claim 1, wherein the colors in combination correspond to colors of articles.

3. The display control apparatus according to claim 1, further comprising:

a color name display section on which said first display control section displays the list of names of colors; and a graph display section on which said second display control section displays in corresponding relationship the group of graphs representing the corresponding groups of numerical data read by said reader section and the corresponding group of character indications which indicate the corresponding group of predetermined impression items.

4. A display control apparatus comprising:

a memory which contains data on a plurality of combinations of two colors, each combination being optimal for producing a respective one of a plurality of combinations of two feelings;

a designating section for designating two feelings to be combined;

a first display control section for displaying a list of feelings;

a reader section responsive to said designating section designating two feelings to be combined from the displayed list of feelings for reading out from said memory data on a combination of two colors optimal for producing a combination of the two designated feelings; and a second display control section for displaying the combination of two colors read out by said reader section.

5. The display control device according to claim 4, further comprising:

a feeling display section on which said first display control section displays the list of feelings; and an optimal color display section on which said second display control section displays the read-out combination of two colors.

* * * * *